United States Patent [19]

Meyn et al.

[11] 4,418,444
[45] Dec. 6, 1983

[54] APPARATUS FOR SEPARATING THE NECK OF A HEADLESS PLUCKED FOWL

[75] Inventors: Pieter Meyn; Cornelis Meyn, both of Oostzaan, Netherlands

[73] Assignee: Meyn Machinefabriek BV, Oostzaan, Netherlands

[21] Appl. No.: 362,036

[22] Filed: Mar. 25, 1982

[30] Foreign Application Priority Data

Mar. 27, 1981 [NL] Netherlands ............ 8101528

[51] Int. Cl.³ .......................................... A22C 21/00
[52] U.S. Cl. .......................................... 17/11; 17/12
[58] Field of Search ................................. 17/11, 12

[56] References Cited
U.S. PATENT DOCUMENTS 4,293,978 10/1981 McDonald et al. ............ 17/12
4,308,639 1/1982 van Mil .......................... 17/12 X
4,322,872 4/1982 Meyn .............................. 17/12

*Primary Examiner*—Willie G. Abercrombie
*Attorney, Agent, or Firm*—Julian W. Dority

[57] ABSTRACT

A rotating apparatus for separating the neck of a headless fowl hanging by the ankle joints from a hook of an overhead conveyor, the apparatus having a fork-shaped clamping member for receiving the neck of the fowl and co-operating with a pivoting pressure arm adapted to be moved into the fork opening of the clamping member to pinch off the fowl'neck. A further fork member is provided above the clamping member and adapted to support the fowl by its shoulders. The fork member and the clamping member with the pressure arm attached thereto are vertically movable in timed relationship in which said two members are first moved together upwards with the fork member close above the clamping member whereupon, after the operation of the pressure arm to break the fowl's neck, the fork member remains in its upper position supporting the fowl while the clamping member together with the pressure arm is moved downwards whereby the separated neck vertebrae are at least partially pulled out of the skin of the neck through the opening previously formed by the removal of the fowl's head.

5 Claims, 3 Drawing Figures

APPARATUS FOR SEPARATING THE NECK OF A HEADLESS PLUCKED FOWL

BACKGROUND OF THE INVENTION

The invention relates to the processing of fowl and more particularly to an apparatus for separating the neck of a headless plucked fowl hanging by the ankle joints from a hook of an overhead conveyor.

In preparing fowl for sale it is normal practice to separate the vertebrae of the neck together with the meat adhering thereto from the remaining part of the spinal column of the fowl, without removing the skin of the neck.

My British Patent Specification No. 1,473,555 discloses such a neck separating apparatus of the rotating type having a number of radially outwardly extending fork-shaped clamping members each adapted to receive the neck of a fowl suspended from the overhead conveyor which clamping members are each mounted for movement along with the conveyor and for vertical movement up and down relative to the fowl. Each clamping member has a pressure arm co-operating therewith and pivotally mounting with respect to the latter for movement between a rest position free of the fork opening of the clamping member and an operating position closing the fork opening and pressing the fowl's neck received in the clamping member to separate the vertebrae of the neck from the rest of the spinal column without damage to the skin of the neck. The clamping member together with the pressure arm are then moved downwards whereby the separated neck together with the meat adhering thereto is at least partially pulled out of the skin of the neck through the opening previously formed by the removal of the fowl's head.

Although this apparatus and others of the same kind generally operate efficiently, they have the disadvantage that the distance through which the separated neck is pulled out of the skin of the neck varies with the size of the fowl so that for fowls of great size the neck vertebrae will not be pulled out of the skin of the neck and for very small birds the neck vertebrae will be pulled too far out of the skin of the neck. The reason for this is the fact that the neck of the fowl is received in the fork opening of the clamping member in a low position of this member whereupon the clamping member is moved upwards whereby the fowl is supported at both sides of its neck by the clamping member and is lifted over a greater or smaller distance depending on the size of the fowl. In this manner it is obtained that independently of the fowl's size the neck is always separated as close as possible to the fowl's body when in the highest position of the clamping member the pressure arm is operated. On the following downward movement of the clamping member and the pressure arm the fowl must first be stretched in the hook of the conveyor in which it is suspended before sufficient pulling force can be exerted on the separated neck vertebrae to pull the latter out of the skin of the neck. This implies that the distance through which the neck vertebrae is pulled out of the skin of the neck is always equal to the distance between the highest and lowest position of the clamping member less the distance through which the fowl was first raised during the upward movement of the clamping member, and it will be clear that a larger fowl is further raised than a smaller one and that as a consequence the distance through which the neck is pulled out of the skin of the neck varies with the size of the fowl.

SUMMARY OF THE INVENTION

The invention has as its object to obviate this disadvantage. More particularly it is an object of the invention to provide an apparatus for automatically separating the vertebrae of the neck and the meat adhering thereto from the remaining part of the spinal column of a fowl in a simple and efficient manner in which the neck vertebrae are pulled away from the spinal column over a predetermined distance through the tubular skin of the neck which distance is independent of the size of the fowl.

According to the invention these objects are attained with an apparatus of the type referred to which comprises a second fork member situated above the clamping member and associated therewith, which fork member is vertically movable up and down relatively to the fowl independently of the clamping member and is adapted to support the fowl on both sides of its neck. The fork member and clamping member are moved in timed relationship, the two members first moving together upwards with the fork member close above the clamping member whereupon, after the operation of the pressure arm to break the fowl's neck, the upper fork member remains in its upper position supporting the fowl while the clamping member together with the pressure arm moves downwards to its lower position whereby the separated neck vertebrae, together with the meat adhering thereto, is at least partially pulled out of the skin of the neck through the opening previously formed by the removal of the fowl's head. During the pulling-out of the neck the fowl remains supported on the additional fork member without being stretched on the conveyor hook from which it is suspended, whereby for each size of the fowl the neck vertebrae are pulled outwardly from the skin of the neck over the same distance which is equal to the stroke of the clamping member between its uppermost and lowermost positions.

BRIEF DESCRIPTION OF THE DRAWINGS

Further features and advantages of the invention will become apparent from the following description of a preferred embodiment of the invention taken in conjunction with the accompanying drawings, in which.

DESCRIPTION OF THE PREFERRED EMBODIMENT

Figure 1:
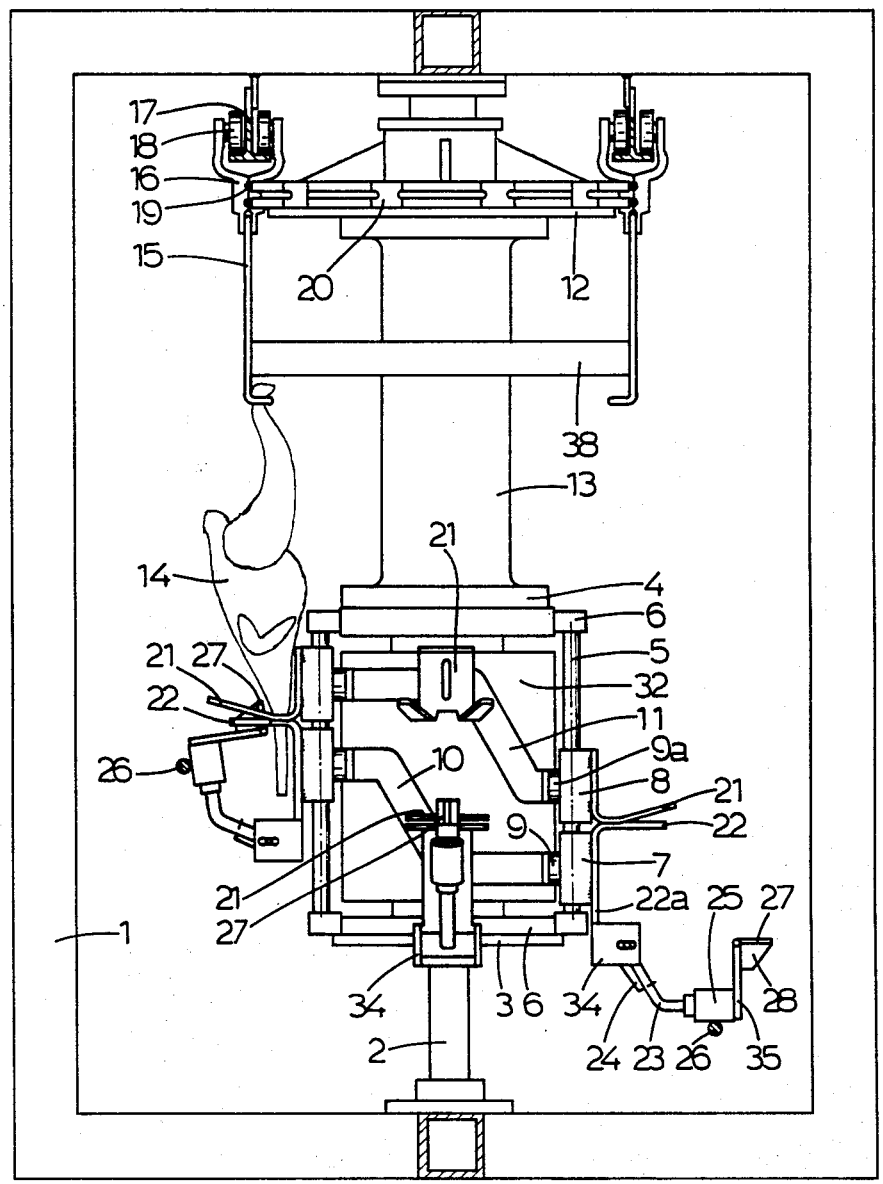
FIG. 1 is a side-view of an apparatus according to the invention.

Referring to the drawings, the apparatus there shown serves to pinch-off the vertebrae of the neck of a headless plucked fowl hanging by the ankle joints from a hook of an overhead conveyor and to partially pull this neck out of the skin of the neck through the opening previously formed by the removal of the fowl's head. The apparatus comprises a frame 1 with a vertical non-rotating central shaft 2 mounted therein. Two horizontally extending circular supports 3 and 4 spaced one above the other are rotatably mounted on the shaft 2. A plurality of vertical guide bars 5 fixedly interconnect the two supports 3 and 4, the guide bars being arranged in pairs which are regularly spaced about the circumference of the supports and which are secured thereto by means of mounting blocks 6. Two sliding blocks 7 and 8 are vertically slidably mounted one above the other on each pair of guide rods 5. The sliding blocks 7 and 8 are provided on the side facing the central shaft 2 with followers 9 and 9a, respectively, which co-operate with camming tracks 10 and 11, respectively, formed into a cylindrical stationary member 32 mounted on the shaft 2. The camming tracks 10 and 11 cause the two sliding blocks 7 and 8 to move up and down with respect to each other and to the conveyor (see below) in a predetermined timed relationship as the guide rods 5 together with the supports 3 and 4 rotate about the shaft 2.

The guide rods 5 and supports 3 and 4 are driven for rotation by a horizontal driving wheel 12 rotatably mounted on the shaft 2 adjacent the upper end thereof and fixedly connected to the upper support 4 by means of a tubular connecting member 13.

The fowl 14 to be processed are supplied to the apparatus by an overhead conveyor having depending hooks 15, each adapted to support a fowl 14 by the ankle joints, as shown in FIG. 1. Each conveyor hook 15 is carried by a shackle 16 having two rollers 17 supported by a rail 18. The shackles 16 of the conveyor are attached to a pulling cable or chain 19 at regular intervals. A part of the rail 18 is concentric with the shaft 2 which rail part is secured to the frame 1 in a position above the driving wheel 12. This driving wheel 12 has a series of notches 20 provided at regular intervals in the outer edge of the wheel 12. The distance between successive notches 20 corresponds with the distance between successive conveyor shackles 16 so that the shackles 16 as they are pulled along the rail 18 by the pulling cable 19, are received within the notches 20 as they reach the apparatus and so rotate the driving wheel 12 about the central shaft 2.

The upper slide block 8 carries on its side facing away from the shaft 2 a generally outwardly extending fork member 21 having flat slightly upwardly curved prongs (see also FIG. 2) and adapted to support a fowl 14 by its shoulders without, however, engaging the neck of the fowl, the fork opening being sufficiently wide and deep to allow the fowl's neck to pass freely therethrough.

Figure 2:
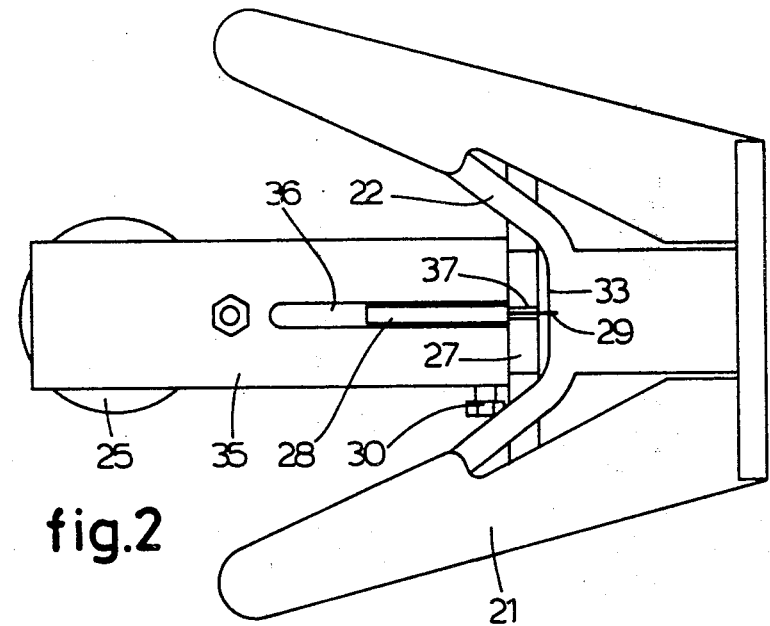
FIG. 2 is a view from above of an operating unit of the apparatus in its raised position as seen in the left-hand side of FIG. 1.

The lower slide block 7 carries a somewhat similarly formed, fork-shaped clamping member 22, the diverging prongs 22 of which extend horizontally outwardly and, at their apex, form a pressure surface 33 which, as seen from above, is situated forwardly of the apex of the fork opening of the upper fork member 21 (FIG. 2).

The clamping member 22 has a downwardly extending arm 22a secured to the slide block 7 and carrying at its lower end mounting means 34 for pivotally supporting a pressure arm 23. The pressure arm 23 carries a follower roller 25 which engages a curved guide rail 26 carried by the frame 1 in a manner not shown. The guide rail 26 which is only shown in cross-section, extends about the shaft 2 to control the movement of the pressure arm 23, a spring 24 acting on the arm 23 to urge the arm 23 downwards with the roller 25 in engagement with the rail 26. The arm 23 has a perpendicular extension 35 carrying at its outer end and again perpendicular thereto a flat member 27 forming the pressure surface of the pressure arm 23 and adapted to enter the fork opening of the members 21 and 22 for co-operation with the opposite pressure surface 33 of the clamping member 22, as shown in FIG. 2 and at left in FIG. 1.

The pressure arm 23 may be provided adjacent its free end with a knife holder 28 mounted in a slot 36 provided in the extension 35 for pivotal movement about a pin 30 passing through this slot 36. A leaf spring 31 secured against the lower side of the extension 35 engages the knife holder 28 to urge the latter towards its rest position shown with full lines in FIG. 3, the spring allowing the knife holder 28 to swing rearwardly through the slot 36, as shown with dotted lines in FIG. 3. A knife 29 having a pointed end is secured in the knife holder 28 and projects through a slot 37 in the member 27.

The apparatus hereinbefore described operates as follows:

When a fowl 14 carried by the conveyor reaches the apparatus, the hook 15 from which the fowl 14 is hanging is brought into contact with a circular guide rail 38 attached to the member 13, so that the fowl 14 is positioned above a processing unit formed by the members 21 and 22 with the associated pressure arm 23. The slide blocks 7 and 8 are in their lowermost positions as shown at right in FIG. 1, and the pressure arm 23 is swung downwardly and outwardly so that the neck of the fowl 14 can freely enter into the fork-shaped clamping member 22 and the fork member 21 situated directly thereabove in almost the same plane. Next the two slide blocks 7 and 8 are together moved along the guide rods 5 to their uppermost position, shown at left in FIG. 1, by the followers 9 and 9a running in the camming tracks 10 and 11, during which movement the relative distance between the slide blocks 7 and 8 does not change. As the slide blocks 7 and 8 are raised, the fork member 21, and to a lesser extent, the clamping member 22 engage the shoulders of the fowl 14 whereby the fowl is lifted by these members until the slide blocks 7 and 8 reach their uppermost position. It will be clear that fowl of greater size will be further lifted than small fowl.

Simultaneously with the upward movement of the slide blocks 7 and 8 the guide rail 26 swings the pressure arm 23 upwards with respect to the slide block 7 against the action of the spring 24 in such a manner that, as shown at left in FIG. 1, in the highest position of the slide block 7 the member 27 of the pressure arm 23 has fully entered the fork openings of the members 21 and 22 to engage the neck of the fowl 14 and to pinch off this neck between the member 27 and the pressure area 33 of the clamping member 22. In the embodiment shown in FIG. 1 the fowl 14 passes through the apparatus with its back turned outwards and for this reason the pressure area of the member 27 engaging the rearside of the neck is formed as a flat vertically extending surface, whereas the pressure surface 33 of the clamping member 22 engaging the frontside of the neck has a smaller vertical width. In this way it is prevented that as the vertebrae of the neck are pinched off, the skin of the neck at the rearside is damaged by being too strongly pressed against the vertebrae. At the frontside the neck has more flesh and other soft tissues which also in the case of a narrow pressure surface prevent damage to the skin of the neck. If the apparatus must be so carried out that the fowl passes through the apparatus with the back turned inwards, the pressure surface 33 of the clamping member 22 is given a greater width and the pressure surface of the member 27 is given a smaller width.

Finally, while the pressure arm 23 is maintained in its upwardly turned operating position, the lower slide block 7 is moved downwards along the guide rods 5 by the follower 9 engaging the camming track 10, while the upper slide block 8 remains in its uppermost position on the guide rods 5, see the pair of guide blocks 7 and 8 shown in the middle of FIG. 1. Thereby the separated neck is pulled out of the skin of the neck by the co-operating clamping member 22 and pressure arm 23 while the fowl remains supported by its shoulders on the upper fork member 21. In this manner it is obtained that whatever the size of the fowl the separated neck is pushed outwardly of the skin of the neck over a constant distance which is equal to the maximum downward stroke of the clamping member 22 with respect to the upper fork member 21.

Figure 3:
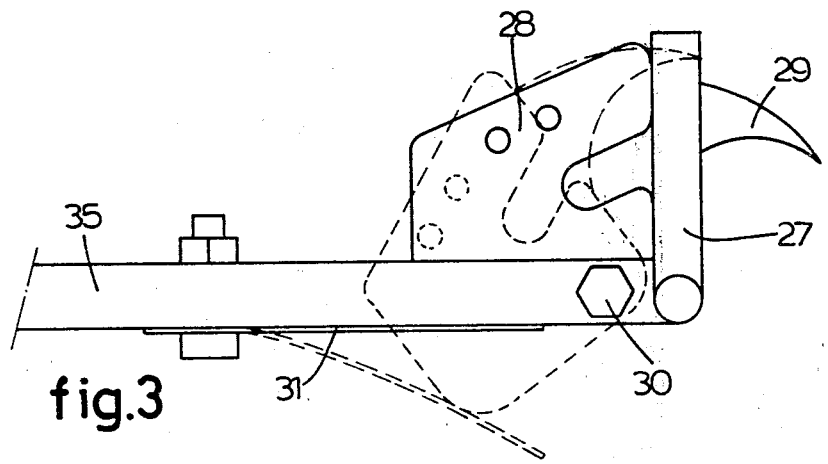
FIG. 3 is a side-view of a pressure arm and the knife mounted thereon, forming a part of the operating unit shown in FIG. 2.

In case a knife 29 is mounted in the knife holder 28 so as to project outwardly of the pressure surface of the member 27, as shown in FIG. 3, the knife 29 will first penetrate the skin of the neck and then be stopped by the neck vertebrae when the pressure arm 23 is swung upwards to pinch off the neck of the fowl 14. The resistance offered by the vertebrae will cause the knife 29 together with the knife holder 28 to swing backwards about the pin 30 against the force of the spring 31, as indicated with dotted lines in FIG. 3. In this manner it is prevented that the knife 29 penetrates into the neck vertebrae and gets stuck therein. When thereupon the neck is pushed out of the neck skin, the knife 29 makes a longitudinal cut in this skin, the knife returning to its relative position shown in FIG. 3 with full lines as soon as it comes free of the vertebrae remaining on the fowl. Because the knife is situated above the pressure surface of the clamping member 22 it can not contact the pinched-off neck vertebrae.

Depending on the selected relative shapes of the camming tracks 10 and 11, defining the stroke of the slide block 7, and of the shape of the guide rail 26, defining the moment the clamping arm 23 is again swung outwards to release the neck, it is possible to obtain that either the neck is completely pulled out of the skin of the neck and is dropped in a collecting means, or the neck is only partly pulled out of the neck skin and left dangling from the end of this skin for final removal at a later stage.

While the invention has been described with particular reference to a preferred embodiment thereof, it will be understood that variations and modifications can be effected within the scope of the following claims.

I claim:

1. An apparatus for separating the neck of a headless plucked fowl hanging by the ankle joints from a hook of an overhead conveyor, said apparatus comprising
a frame,
at least one horizontally extending fork-shaped clamping member adapted to receive the neck of a fowl suspended from said conveyor, said clamping member being mounted in said frame for movement along with said conveyor and for vertical movement up and down relative to the fowl,
means for controlling the vertical movement of said clamping member,
a pressure arm co-operating with said clamping member and pivotally mounted with respect to the latter for movement between a first rest position free of the fork opening of said clamping member and a second operating position closing said fork opening and pressing the fowl's neck received in the clamping member to pinch off the vertebrae of the neck from the remaining part of the spinal column of the fowl while leaving the skin of the neck intact,
means for operating said pressure arm in timed relationship to the movements of said clamping member, said means moving said arm to its said second position when the clamping member is substantially in its upper position,
a second fork member situated above said clamping member, likewise mounted in said frame for movement along with said conveyor and for vertical movement up and down relative to the fowl, said fork member being adapted to support the fowl on both sides of its neck, and
means for moving said fork member in timed relationship with the movement of said clamping member in such a manner that said two members are moved together upwards with the fork member close above the clamping member and that, after the operation of the pressure arm to break the fowl's neck, the fork member remains in its upper position supporting the fowl while the clamping member together with the pressure arm is moved downwards whereby the separated neck vertebrae are at least partially pulled out of the skin of the neck through the opening previously formed by the removal of the fowl's head.

2. The apparatus of claim 1 further comprising at least one guide means movably mounted in said frame,
means for moving said guide means along with said conveyor,
a first slide member vertically reciprocatably mounted on said guide means and carrying said fork member,
a second slide member vertically reciprocatably mounted on said guide member below said first slide member and carrying said clamping member as well as said pivotable pressure arm,
follower means on each of said slide members,
two camming track means, one associated with each of said slide blocks and co-operating with said respective follower means, and
guide rail means controlling the movement of said pressure arm.

3. The apparatus of claim 1 in which the fowl are supplied to the apparatus in a predetermined position with respect to said clamping member and in which the pressure areas of said clamping member and said pressure arm have different heights, the pressure area engaging the back of the neck having a greater height than the pressure area engaging the frontside of the neck.

4. The apparatus of claim 1 further comprising a knife mounted on either the pressure arm or the clamping member at the upper side thereof and arranged to make a vertical cut in the skin of the neck at the rearside thereof as the neck vertebrae are pulled out of the skin.

5. The apparatus of claim 4 in which said knife is mounted for movement towards and away from the neck receiving opening of the clamping member, a spring urging said knife towards said opening.

* * * * *